INVENTOR
JOHN C. BEGGS

BY
Teller & McCormick
ATTORNEYS

INVENTOR
JOHN C. BEGGS

United States Patent Office 2,959,028
Patented Nov. 8, 1960

1

2,959,028

EMERGENCY TEMPERATURE CONTROL MEANS FOR AIRCRAFT AIR CONDITIONING SYSTEM

John C. Beggs, Manchester, Conn., assignor to United Aircraft Corporation, East Hartford, Conn., a corporation of Delaware Filed Oct. 27, 1959, Ser. No. 849,109

6 Claims. (Cl. 62—172)

This invention relates to aircraft air conditioning systems and, more particularly, to temperature control means for such systems.

It is the general object of the invention to provide a manually operable temperature control means which can be employed in an aircraft air conditioning system with an automatic electrical temperature control means and which is particularly adapted for use under emergency conditions on failure of the automatic control means.

Another object of the invention is to provide a manually operable control means of the pneumatic type which is characterized by simplicity of construction and a high degree of dependability in its operation.

Still another object of the invention is to provide a manually operable control means of the type mentioned which provides for a minimum flow of air to a compartment served by the air conditioning system in order to meet ventilation and pressurization requirements of the compartment.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figure 1:
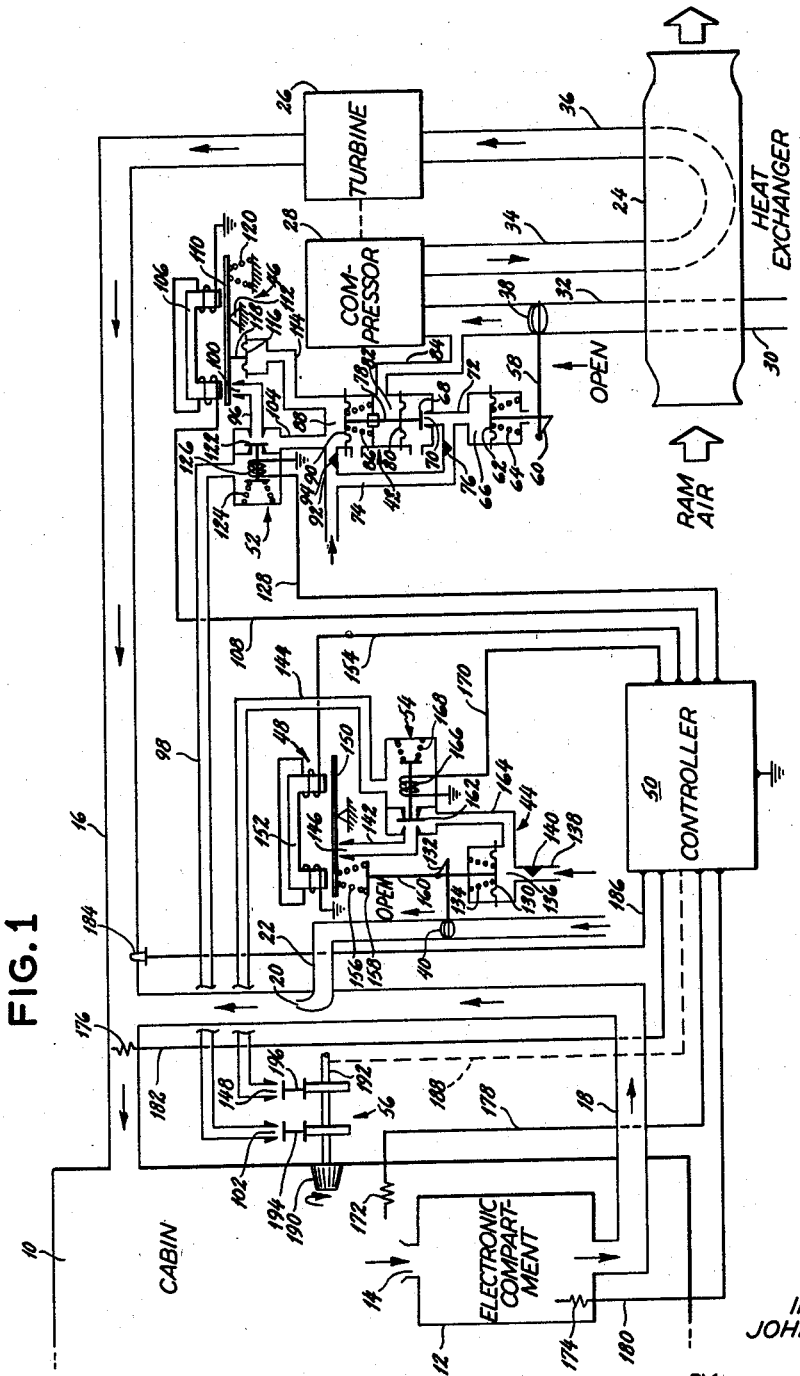
Fig. 1 is a schematic illustration of an aircraft air conditioning system provided with the control means of the present invention.

The air conditioning system shown in Fig. 1 is adapted to supply conditioned air to at least one aircraft compartment such as a cabin 10, as shown, the system also supplies an electronics compartment 12 which is located within the cabin 10 and provided with an inlet opening 14 for receiving air from the cabin. A first cabin supply conduit 16 is connected with a source of cold air under pressure in a manner to be described so that the cabin 10 and the electronics compartment 12 can be cooled as required. Heating of the cabin is accomplished by recirculating air from the electronics compartment and adding hot air to the recirculating air in a manner to be described.

A recirculation conduit 18 extends between the electronics compartment 12 and the first supply conduit 16 and directs air discharged from the electronics compartment to the said supply conduit for reintroduction to the cabin 10. Disposed in the recirculation conduit 18 is a jet nozzle 20 formed at the end of a conduit 22. The conduit 22 comprises a second supply conduit and is connectible with a source of hot air under pressure as for example with the compressor of a jet engine in the airplane. Hot air flowing from the jet nozzle 20 induces a flow of air from the electronics compartment through the recirculation conduit to the supply conduit 16 and the cabin 10.

2

As shown, the first supply conduit 16 is supplied with cold air under pressure from a refrigeration unit comprising a multi-stage heat exchanger 24, a turbine 26 and a compressor 28. The multi-stage heat exchanger 24 utilizes ram air as a cooling medium and receives hot pressurized air from the compressor of a jet engine in the aircraft through a conduit 30. After passing through the heat exchanger and being partially cooled, air from the conduit 30 is directed through a conduit 32 to the compressor 28 which is driven by the turbine 26. Having passed through the compressor 28 wherein some heat is restored, the air is returned to the heat exchanger 24 through a conduit 34 for further cooling in the second stage thereof. The air is then discharged from the second or final stage of the heat exchanger 24 through a conduit 36. The conduit 36 extends to the turbine 26 which drives the compressor 28, said turbine being driven by the air discharged from the final or second stage of the heat exchanger 24 and serving to further cool the air by expansion. Air discharged from the turbine enters the supply conduit 16 for delivery to the cabin 10 and the electronics compartment 12.

It will be apparent that control of temperature in the cabin and in the electronics compartment may be exercised by regulating the amount of cold air passing through the supply conduit 16 from the above-described refrigeration unit and the amount of warm or hot air added to this cold air from the recirculation conduit 18 and the hot air supply conduit 22. As shown, the air conditioning system includes a valve 38 disposed in the conduit 32 extending between the heat exchanger 24 and the compressor 28. Said conduit 32 may be said to form an extension of the first supply conduit 16 and the valve 38 may thus be described as located in the said first supply conduit. A valve 40 disposed in the hot air supply conduit 22 is adapted to regulate the flow of air therethrough and thus regulate the quantity and temperature of air added to the air flowing in the supply conduit 16 from the recirculation conduit 18.

The valve 38 has operatively connected therewith a fluid pressure responsive control means and, more specifically, a pneumatically operable control means indicated generally at 42. Similarly, the valve 40 has a pneumatically operable control means 44 operatively connected therewith. A first transducer indicated generally at 46 is adapted to convert electrical signals to air pressure signals and is associated with the valve control means 42. A second similar transducer indicated generally at 48 is associated with the valve control means 44. Each of the transducers 46 and 48 is operatively connected with an automatically operable electrical temperature controller 50 and each of the said transducers may be operatively connected with its associated valve control means. First and second selector means indicated generally at 52 and 54 serve respectively to connect the transducer 46 with the valve control means 42 and the transducer 48 with the valve control means 44. Such connection of the transducers and valve control means is effected for automatic or normal temperature control. The selector means 52 and 54 also serve to disconnect the transducers 46 and 48 from their respective valve control means and to operatively connect the said valve control means with a manually operable temperature control means indicated generally at 56. Preferably and as will be explained more fully hereinbelow, the selector means 52 and 54 are adapted to automatically provide for manual temperature control on failure of the automatic temperature controller 50.

The valve 38 and valve control means 42 are substantially the same as those described in the copending application of Stanley G. Best, Serial No. 655,664, filed April 29, 1957, and entitled "Dual Supply Air Conditioning System Having Valve Means for Equalizing the Supply Flow" and reference may be had to the said application to supplement the present description. As in the case of the valve and control means in the aforesaid copending application, the valve control means 42 is adapted to adjust the position of the valve 38 so as to maintain selected valve downstream pressures. The valve 38 is shown as being of the butterfly type and is provided with a stem 58 which is connected by suitable motion transmitting means 60 with an actuator piston 62 of the diaphragm type. The diaphragm 62 is biased in one direction by a spring 64 and air pressure in an actuating chamber 66 urges the said diaphragm in an opposite direction. Actuating pressure in the chamber 66 is determined by the position of a small poppet valve 68 adjacent a vent orifice 70 formed at the end of a conduit 72 extending from the said chamber. A servo conduit 74 having a restriction 76 therein communicates with the conduit 72 and supplies servo air under pressure to said conduit and to the actuating chamber 66.

The small poppet valve 68 is carried by a stem 78 and is positioned adjacent the vent orifice 70 by movement of said stem. A diaphragm 80 fixedly connected to the valve stem 78 is acted on by air at substantially valve downstream pressure in a chamber 82, the said chamber being connected with the conduit 32 downstream of the valve 38 by a conduit 84. The pressure force of air in the chamber 82 on the diaphragm 80 is balanced by the net pressure force of a spring 86 and air pressure in a biasing or control chamber 88. The spring 86 and air in the chamber 88 act in opposite directions on a diaphragm 90 which is fixedly connected to the upper end of the stem 78.

From the foregoing, it will be apparent that the air pressure in the control chamber 88 determines the pressure in the conduit 32 downstream of the valve 38. That is, with a comparatively high control pressure in the chamber 88, the poppet valve 68 will move relative to the vent orifice 70 as required to adjust the pressure in the actuating chamber 66 and the position of the valve 38 for a comparatively low valve downstream pressure. Conversely, a comparatively low control pressure in the chamber 88 will result in a comparatively high pressure in the conduit 32 downstream of the valve 38. Flow through the conduit 16 may be said to vary generally with the pressure downstream of the valve 38.

Under normal conditions of operation wherein control of temperature in the aircraft cabin and electronics compartment is effected by the electrical temperature controller 50, the transducer 46 receives electrical signals from said controller and converts the same to proportionate air pressure signals in the control chamber 88. The said control chamber is supplied with servo air through a branch servo supply conduit 92 which communicates with the servo supply conduit 74 and with said chamber and which is provided with a restriction 94. In accordance with the invention, the control chamber 88 is provided with first and second control conduits 96 and 98 each of which has a vent orifice at its free end, said vent orifices being identified by the reference numerals 100 and 102 respectively. The control conduits 96 and 98 extend from the selector means 52 in the embodiment of the invention shown and may be connected with the control chamber 88 through said selector means and a connecting conduit 104. In Fig. 1 the first control conduit 96 is shown connected with the control chamber 88 via the selector means 52 and the connecting conduit 104 with the transducer 46 exercising control over the air pressure in the said conduits and control chamber.

The transducer 46 is shown as comprising a conventional electrically operable valve of the proportional solenoid type. A proportional solenoid 106 is operatively connected with the electrical controller 50 by a conductor 108 and has an armature or valve member 110 which is pivotally supported at 112 and movable relative to the vent orifice 100 to vary the effective opening thereof and thus vary the pressure in the conduits 96 and 104 and the control chamber 88. Pressure feedback to the armature or valve member 110 is provided for in a conventional manner by means of a conduit 114, a diaphragm 116 and a suitable linkage 118. Also acting on the armature 110 is a balancing spring 120.

The selector means 52 may take various forms within the scope of the invention, but preferably comprises an electrically operable valve as shown. A small poppet valve 122 movable from a first to a second position is held in its said first position wherein it is shown by a solenoid 126 connected with the electrical controller 50 by a conductor 128. A spring 124 biases the poppet valve 122 toward its second position and is operable to move said valve to its said second position on loss of electrical power to the solenoid 126. In its first position, the poppet valve 122 connects the first control conduit 96 with the control chamber 88 via the connecting conduit 104, the second control conduit 98 being disconnected from the said control chamber. In its second position, the poppet valve 122 disconnects the first control conduit 96 from the control chamber 88 and connects the second control conduit 98 with the said chamber. Thus, connection of the manually operable temperature control means 56 with the valve control means 42 is automatically effected by the selector means 52 on loss of electrical power in the electrical controller 50 reflected in de-energization of the solenoid 126.

The valve control means 44 associated with the valve 40 in the hot air supply conduit 22 is of the simple positioning type. That is, the said control means merely establishes a known valve position for a given air pressure input signal. A valve actuating diaphragm 130 is connected with the valve 40 which may be of the butterfly type by means of a suitable motion transmitting mechanism 132. The said diaphragm is biased in one direction by a spring 134 and is urged in an opposite direction by air in an actuating or control chamber 136. The actuating or control chamber 136 has a servo supply conduit 138 provided with a restriction 140 connected thereto and is also provided with a first control conduit 142 and a second control conduit 144. The first control conduit 142 has a vent orifice 146 at its free end and the second control conduit 144 has a vent orifice 148 at its free end.

The transducer 48 may be identical with the transducer 46 and is so shown with a pivotally supported valve member or armature 150 operatively associated with a proportional solenoid 152 and with the vent orifice 146. A conductor 154 connects the proportional solenoid 152 with the electrical controller 50. A force feedback means is provided in conventional manner for the armature 150 and comprises a spring 156 engaging the armature or valve member 150 and provided with a movable seat 158 which is connected with the motion transmitting mechanism 132 by a link 160.

The selector means 54 may be substantially identical with the selector means 52 and is so shown. A poppet valve 162 has a first position as shown wherein it connects the first control conduit 142 with a connecting conduit 164 extending to the control chamber 136. In said first position of the poppet valve 162, the second control conduit 144 is disconnected from the connecting conduit 164 and the control chamber 136 as shown. In a second position the poppet valve 162 disconnects the first control conduit 142 from the connecting conduit 164 and the control chamber 136 and connects the said connecting conduit and control chamber with the second control conduit 144. A solenoid 166 holds the poppet valve 162 in its first position against the bias of a spring 168, the said spring being operable to move the said valve to its second position on de-energization of the solenoid 166. A line 170 connects the solenoid 166 to the electrical controller 50. Thus, movement of the poppet valve 162 from its first to its second position will occur automatically on loss of electrical power in the controller 50 and control of the valve control means 44 and valve 40 by the manually operable means 56 will thereupon occur.

From the foregoing, it will be apparent that the electrically operable controller 50 can automatically regulate temperatures within the cabin 10 and the electronics compartment 12 by transmitting appropriate electrical signals to the transducers 46 and 48. Said controller may be substantially the same as that shown and described in the copending application of Charles B. Brahn, Serial No. 679,973, filed August 23, 1957, now Patent No. 2,937,011, and entitled "Aircraft Air Conditioning System and Temperature Control Means Therefor." Accordingly, the controller is shown in the drawings in block form and will be described in general terms only herein, the aforesaid copending application serving to supplement the present description where necessary.

The controller 50 receives input signals from temperature sensitive elements 172, 174 and 176 via conductors 178, 180 and 182 respectively. The said controller also receives input signals from a flow sensitive element 184 via a conductor 186 and from the manually operable means 56 as indicated by a broken line 188. The temperature sensitive elements 172 and 174 are located respectively within the cabin 10 and the electronics compartment 12 and provide signals enabling the controller 50 to regulate the absolute temperature in the said compartments. The temperature sensitive element 176 is located within the supply conduit 16 and provides a signal which is utilized in controlling the rate of temperature change within said conduit and within the cabin. The flow sensitive element 184 is disposed within the supply conduit 16 and is utilized within the controller 50 in providing for a minimum flow of air to the cabin 10 under all conditions of operation. Such a minimum flow is needed to satisfy ventilation and pressurization requirements of the cabin. The signal supplied to the controller 50 from the manually operable means 56 and indicated by the broken line 188 is a mechanical signal reflecting the desired cabin temperature as selected by the aircraft operator or other cabin occupant. A selector knob 190 disposed within the cabin 10 is adapted to be turned manually to rotate a shaft 192. The broken line 188 represents a connection between the said shaft and one or more variable resistance devices within the controller 50 which are utilized to provide reference signals for the regulation of cabin temperature by the controller.

Under automatic temperature control, the selector knob 190 may be turned to a desired cabin temperature. The electrical controller 50 will thereupon automatically signal the transducers 46 and 48 as required to effect adjustment of the valves 38 and 40 and adjustment of the relative proportions of cold and hot air entering the cabin whereby to provide and maintain the desired temperature. The controller will also control and limit the rate of change of temperature in the conduit 16 and in the cabin 10 and will provide for regulation of the electronics compartment temperature in keeping with the cooling requirements thereof. In the event that the air flow to the cabin 10 would be insufficient for ventilation and pressurization if regulated solely for temperature control purposes, the controller 50 will give priority to the signal from the flow sensitive element 184 and maintain a predetermined minimum flow of air to the cabin.

Figure 2:
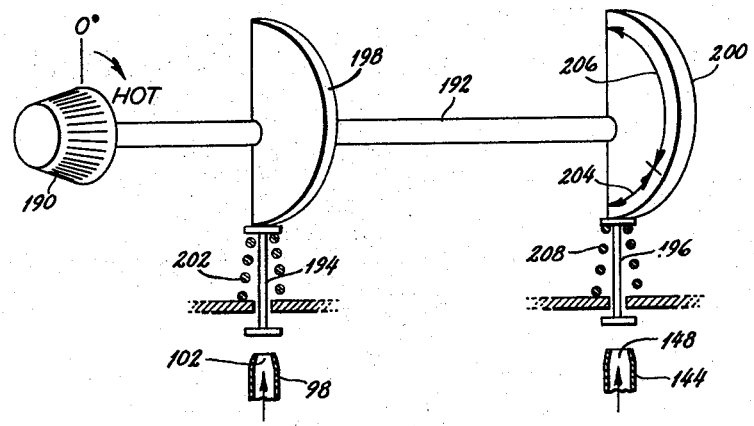
Fig. 2 is an enlarged schematic illustration of a portion of the control means of the present invention.

On loss of electrical power in the controller 50, the selector means 52 and 54 will automatically connect the second control conduits 98 and 144 with the control chambers 88 and 136 of the valve control means 42 and 44. The temperature within the cabin 10 may then be controlled with the aforementioned manually operable control means 56. In the preferred form shown, the said manually operable control means comprises first and second valves 194 and 196 operatively associated respectively with the vent orifices 102 and 148 at the free ends of the conduits 98 and 144. As best shown in Fig. 2, the valves 194 and 196 are moved toward and away from their respective orifices by means of first and second cams 198 and 200 fixedly mounted on the rotatable shaft 192. The shaft 192 is adapted to be rotated by the selector knob 190 mentioned above and, as shown in Fig. 2, the said knob, shaft, and cams may be rotated in a clockwise direction viewed from the left to increase the temperature in the cabin 10. Counterclockwise rotation of the said elements will result in a decreased temperature in the said cabin.

Figure 3:
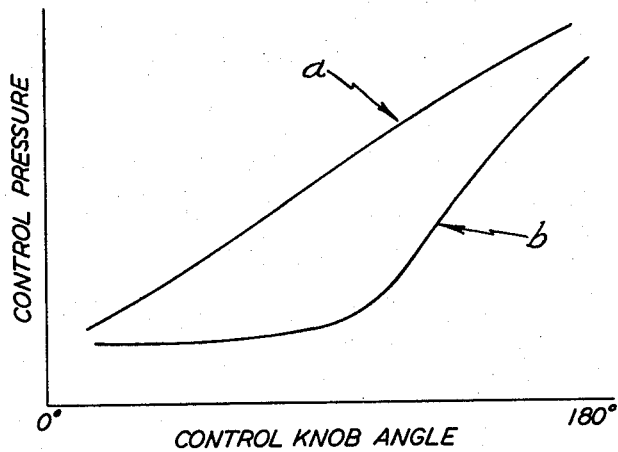
Fig. 3 shows two control pressure curves which can be provided with the control means of the invention.

Rotation of the cam 198 in the clockwise direction allows the valve 194 to be moved toward the orifice 102 at the end of the conduit 98 by a biasing spring 202 which holds the said valve in engagement with the cam 198. The radius of the cam 198 increases at a substantially constant rate as it is rotated in its clockwise direction. Thus, the effective opening of the orifice 102 decreases at a substantially constant rate and the control pressure in the conduit 98 and in the control chamber 88 of the valve control means 42 increases at a substantially constant rate (see curve $a$, Fig. 3) and the valve 38 is positioned as required to decrease valve downstream pressure at a substantially constant rate. Thus, it can be said that the flow of air past the valve 38 and the flow of cold air to the cabin 10 is reduced at a substantially constant rate with rotation of the control knob 190 in the clockwise direction. Furthermore, the temperature of the air flowing to the cabin 10 through the conduit 16 is increased due to a reduced pressure ratio across the turbine 26.

The cam 200 controlling the operation of the valve 198 has a first portion 204 of substantially constant radius and a second portion 206 of the said cam has a radius which increases at a substantially constant rate. The valve 196 is held in engagement with the cam 200 by means of a spring 208 and provides a control pressure in the conduit 144 which is at first substantially constant and thereafter increasing at a substantially constant rate (see curve $b$ Fig. 3). This control pressure is felt in the control chamber 136 and causes the valve 40 to follow a similar schedule. That is, the valve 40 remains closed while the control pressure in the chamber 136 is substantially constant and is thereafter opened at a substantially constant rate as the said control pressure increases at a substantially constant rate. Thus, it will be seen that the flow of hot air through the supply conduit 22, the recirculation conduit 18 and into the supply conduit 16 and the cabin 10 is at first prevented but thereafter permitted and increased at a substantially constant rate as the control knob 190 is rotated in the clockwise direction.

From the foregoing, it will be apparent that the manually operable control means 56 provides first and second variable fluid pressure signals for use in the valve control means 42 and 44. By means of suitable cams, the said two pressure signals may be varied in keeping with a predetermined schedule which provides for movement of the valves 38 and 40 in opposite directions. It will be further apparent that the said two fluid pressure signals may be varied with respect to each other so that the valves 38 and 40 will provide for a desired minimum ventilation and pressurization flow of air to the cabin under all conditions of operation. That is, the control pressures in the conduits 98 and 144 may be varied with respect to each other so that the valves 38 and 40 will never be fully closed simultaneously and so that the aggregate flow of air through the said valves will always equal or exceed a predetermined minimum. The cams 198 and 200 provide the curves of control pressure for the two valves 38 and 40 shown in Fig. 3 and thus provide for such a predetermined minimum flow, the valve 40 being opened before the valve 38 is completely closed with the said control pressure curves. Obviously, where a minimum flow requirement for ventilation and/or pressurization does not exist, the control pressures can be scheduled to provide for complete closing of the cold air valve prior to opening of the hot air valve.

From the foregoing, it will be apparent that the manually operable temperature control means 56 can be employed to regulate cabin temperature under emergency conditions when the automatic temperature controller 50 is inoperative. The aircraft operator or other occupant of the cabin may rotate the temperature selector knob 190 in a clockwise direction to increase cabin temperature and in a counterclockwise direction to decrease cabin temperature. This results merely in the establishment of a given pressure downstream of the valve 38 and a given position of the valve 40 and the flow of hot and/or cold air to the cabin may of course vary thereafter with changes in supply temperatures and pressures. There is no provision for automatic correction for such changes and maintenance of a selected cabin temperature as with the automatic temperature controller 50, but the operator or other occupant may effect temperature corrections manually by further rotating the selector knob 190 to maintain comfortable conditions. Irrespective of the angular position of the selector knob 190 chosen by the aircraft operator or other cabin occupant, a minimum flow of air will be automatically provided and ventilation and pressurization requirements will be met under all conditions of operation.

The invention claimed is:

1. In an air conditioning system for at least one aircraft compartment, the combination of a supply conduit for the compartment connectible with a source of temperature conditioned air, a valve adjustable between open and closed positions in said conduit for regulating the flow of conditioned air to said compartment, fluid pressure responsive control means operatively connected with said valve, a transducer adapted to convert electrical signals to proportionate fluid pressure signals, an automatically operable electrical temperature controller operatively connected with said transducer, a manually operable temperature control means adapted to provide a variable fluid pressure signal, and selector means having a first position in which it operatively connects said valve control means with said transducer for automatic control of compartment temperature by said electrical controller and having a second position in which it operatively connects said valve control means with said manually operable control means for manual control of compartment temperature, said selector means being operatively connected with said electrical controller and movable automatically from its first to its second position on loss of electrical power in said controller.

2. In an air conditioning system for at least one aircraft compartment, the combination of first and second supply conduits for the compartment connectible respectively with sources of cold and hot air under pressure, first and second valves disposed respectively in said supply conduits and adjustable therein between open and closed positions for regulating flow therethrough, first and second fluid pressure responsive valve control means, first and second transducers each adapted to convert electrical signals to proportionate fluid pressure signals, an automatically operable electrical temperature controller operatively connected with each of said transducers, a manually operable temperature control means adapted to provide first and second variable fluid pressure signals, and first and second selector means having first positions in which they respectively operatively connect said first and second valve control means with said first and second transducers for automatic control of compartment temperature by said electrical controller and having second positions in which they respectively operatively connect said first and second valve control means with said manually operable control means for receipt of said first and second fluid pressure signals by said valve control means for manual control of compartment temperature, said first and second selector means each being operatively connected with said electrical controller and movable automatically from its first to its second position on loss of electrical power in said controller.

3. In an air conditioning system for at least one aircraft compartment, the combination of first and second supply conduits for the compartment connectible respectively with sources of cold and hot air under pressure, first and second valves disposed respectively in said supply conduits and adjustable therein between open and closed positions for regulating flow therethrough, first and second fluid pressure responsive valve control means, first and second transducers each adapted to convert electrical signals to proportionate fluid pressure signals, an automatically operable electrical temperature controller operatively connected with each of said transducers, a manually operable temperature control means adapted to provide first and second fluid pressure signals which are variable with respect to each other in keeping with a predetermined schedule which provides for movement of said first and second valves in opposite directions on receipt of said signals by said first and second valve control means, and first and second selector means having first positions in which they respectively operatively connect said first and second valve control means with said first and second transducers for automatic control of compartment temperature by said electrical controller and having second positions in which they respectively operatively connect said first and second valve control means with said manually operable control means for receipt of said first and second fluid pressure signals by said valve control means for manual control of compartment temperature, said first and second selector means each being operatively connected with said electrical controller and movable automatically from its first to its second position on loss of electrical power in said controller.

4. In an air conditioning system for at least one aircraft compartment, the combination of first and second supply conduits for the compartment connectible respectively with sources of cold and hot air under pressure, first and second valves disposed respectively in said supply conduits and adjustable therein between open and closed positions for regulating flow therethrough, first and second pneumatically operable valve control means each having a control chamber provided with first and second control conduits each of which has a vent orifice at its free end, first and second electrically operable valves operatively associated respectively with the vent orifices at the free ends of said first control conduits for regulating control chamber pressure in said first and second valve control means, an automatically operable electrical temperature controller operatively connected with each of said electrically operable valves, an emergency temperature controller comprising a pair of manually operable valves operatively associated respectively with the vent orifices at the free ends of said second control conduits for regulating control chamber pressure in said first and second valve control means, first selector means operatively associated with the first and second control conduits of said first valve control means and adapted to selectively connect said conduits with the control chamber of said control means to provide for control of compartment temperature automatically by said electrical controller and manually by said emergency controller, and second selector means operatively associated with the control conduits of said second valve control means and adapted to selectively connect the same with the control chamber of said control means to provide for automatic and manual temperature control, said first and second selector means each being operatively connected with said electrical controller and operable in response to loss of electrical power in said controller to connect said second control conduits with the control chambers of their corresponding valve control means for manual temperature control.

5. In an air conditioning system for at least one aircraft compartment, the combination of first and second supply conduits for the compartment connectible respectively with sources of cold and hot air under pressure, first and second valves disposed respectively in said supply conduits and adjustable therein between open and closed positions for regulating flow therethrough, first and second pneumatically operable valve control means each having a control chamber provided with first and second control conduits each of which has a vent orifice at its free end, first and second electrically operable valves operatively associated respectively with the vent orifices at the free ends of said first control conduits for regulating control chamber pressure in said first and second valve control means, an automatically operable electrical temperature controller operatively connected with each of said electrically operable valves, an emergency temperature controller comprising a pair of manually operable valves operatively associated respectively with the vent orifices at the free ends of said second control conduits for regulating control chamber pressure in said first and second valve control means, said manually operable valves being coordinated in their operation so that said control chamber pressures are regulated to provide for movement of said first and second valves in opposite directions, first selector means operatively associated with the first and second control conduits of said first valve control means and adapted to selectively connect said conduits with the control chamber of said control means to provide for control of compartment temperature automatically by said electrical controller and manually by said emergency controller, and second selector means operatively associated with the control conduits of said second valve control means and adapted to selectively connect the same with the control chamber of said control means to provide for automatic and manual temperature control, said first and second selector means each being operatively connected with said electrical controller and operable in response to loss of electrical power in said controller to connect said second control conduits with the control chambers of their corresponding valve control means for manual temperature control.

6. In an air conditioning system for at least one aircraft compartment, the combination of first and second supply conduits for the compartment connectible respectively with sources of cold and hot air under pressure, first and second valves disposed respectively in said supply conduits and adjustable therein between open and closed positions for regulating flow therethrough, first and second pneumatically operable valve control means each having a control chamber provided with first and second control conduits each of which has a vent orifice at its free end, first and second electrically operable valves operatively associated respectively with the vent orifices at the free ends of said first control conduits for regulating control chamber pressure in said first and second valve control means, an automatically operable electrical temperature controller operatively connected with each of said electrically operable valves, an emergency temperature controller comprising a pair of valves operatively associated respectively with the vent orifices at the free ends of said second control conduits for regulating control chamber pressure in said first and second valve control means and also comprising manually operable valve actuating means adapted to provide for coordinated operation of said valves whereby said control chamber pressures are regulated to provide for movement of said first and second valves in opposite directions and for a minimum aggregate flow of air through said two valves to the aforesaid compartment, first selector means operatively associated with the first and second control conduits of said first valve control means and adapted to selectively connect said conduits with the control chamber of said control means to provide for control of compartment temperature automatically by said electrical controller and manually by said emergency controller, and second selector means operatively associated with the control conduits of said second valve control means and adapted to selectively connect the same with the control chamber of said control means to provide for automatic and manual temperature control, said first and second seletcor means each being operatively connected with said electrical controller and operable in response to loss of electrical power in said controller to connect said second control conduits with the control chambers of their corresponding valve control means for manual temperature control.

References Cited in the file of this patent

UNITED STATES PATENTS

| | | |
|---|---|---|
| 2,474,441 | Sparrow | June 28, 1949 |
| 2,632,307 | Massey | Mar. 24, 1953 |